United States Patent
Wynn et al.

(10) Patent No.: US 10,690,747 B2
(45) Date of Patent: Jun. 23, 2020

(54) SYSTEMS AND METHODS FOR DETERMINING OPERATOR LOCATION TO ENSURE APPROVED OPERATION OF WORK MACHINES

(71) Applicant: Vermeer Manufacturing Company, Pella, IA (US)

(72) Inventors: Alexander Wynn, Pella, IA (US); Christopher Simmons, Pella, IA (US); Jon Stanford, New Sharon, IA (US); Tenny Hinshaw, Kellog, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 16/310,337

(22) PCT Filed: Jun. 14, 2017

(86) PCT No.: PCT/US2017/037471
§ 371 (c)(1),
(2) Date: Dec. 14, 2018

(87) PCT Pub. No.: WO2017/218669
PCT Pub. Date: Dec. 21, 2017

(65) Prior Publication Data
US 2019/0331761 A1 Oct. 31, 2019

Related U.S. Application Data

(60) Provisional application No. 62/350,052, filed on Jun. 14, 2016.

(51) Int. Cl.
*G01S 5/16* (2006.01)
*E02F 9/20* (2006.01)
(Continued)

(52) U.S. Cl.
CPC ............... *G01S 5/16* (2013.01); *E02F 9/205* (2013.01); *E02F 9/24* (2013.01); *E02F 9/262* (2013.01);
(Continued)

(58) Field of Classification Search
None
See application file for complete search history.

(56) References Cited

U.S. PATENT DOCUMENTS

| 5,450,068 | A | | 9/1995 | Steffen | |
|---|---|---|---|---|---|
| 5,481,257 | A | * | 1/1996 | Brubaker | ............... A63H 30/04 340/12.55 |

(Continued)

FOREIGN PATENT DOCUMENTS

| DE | 102011107091 A1 | 1/2013 |
|---|---|---|
| EP | 2846209 A2 | 3/2015 |
| JP | 2014047607 A | 3/2014 |

OTHER PUBLICATIONS

PCT/US2017/037471 International Search Report and Written Opinion of the International Searching Authority dated Aug. 16, 2017 (9 pages).

(Continued)

*Primary Examiner* — David W Lambert
(74) *Attorney, Agent, or Firm* — Michael Best and Friedrich LLP

(57) ABSTRACT

A system for determining a location of a work machine operator relative to a work machine comprises a machine controller, a radio frequency receiver, and an infrared transmitter unit. The unit comprises a plurality of infrared transmitters configured to generate infrared signals that collectively divide a 360-degree area around the infrared transmitter unit into a plurality of zones. A remote controller remote from the work machine, which comprises a radio frequency transceiver and an infrared receiver, is configured (Continued)

to receive the infrared signal generated by at least one of the plurality of infrared transmitters. The remote controller has a computer system which is configured to decode information within the one or more infrared signals to determine whether the operator is in an approved zone. The computer system enables the radio frequency transceiver to communicate with the radio frequency receiver upon determining that the operator is in the approved zone.

21 Claims, 12 Drawing Sheets

(51) Int. Cl.
E02F 9/24 (2006.01)
E02F 9/26 (2006.01)
G01S 5/00 (2006.01)
G08C 23/04 (2006.01)
E02F 5/06 (2006.01)

(52) U.S. Cl.
CPC ............ *G01S 5/0027* (2013.01); *G08C 23/04* (2013.01); *E02F 5/06* (2013.01)

(56) References Cited

U.S. PATENT DOCUMENTS

| | | | |
|---|---|---|---|
| 5,646,843 A * | 7/1997 | Gudat | B60K 31/0008 348/114 |
| 5,746,261 A | 5/1998 | Bowling | |
| 6,208,260 B1 | 3/2001 | West et al. | |
| 6,283,220 B1 | 9/2001 | Carter | |
| 6,285,925 B1 | 9/2001 | Steffen | |
| 6,784,800 B2 | 8/2004 | Orzechowski | |
| 6,810,353 B2 | 10/2004 | Schiffbauer | |
| 6,963,278 B2 | 11/2005 | Frame | |
| 6,997,648 B2 | 2/2006 | Steffen | |
| 7,657,492 B2 | 2/2010 | Rieger et al. | |
| 7,890,235 B2 | 2/2011 | Self et al. | |
| 8,115,650 B2 | 2/2012 | Dasilva et al. | |
| 8,232,888 B2 | 7/2012 | Frederick et al. | |
| 8,272,467 B1 | 9/2012 | Staab | |
| 8,487,761 B2 | 7/2013 | Eitle et al. | |
| 8,651,581 B2 | 2/2014 | Weigel | |
| 8,689,868 B2 | 4/2014 | Lerche et al. | |
| 8,810,390 B2 | 8/2014 | Frederick | |
| 8,868,301 B2 | 10/2014 | Self et al. | |
| 9,334,627 B2 | 5/2016 | Self et al. | |
| 10,047,500 B2 | 8/2018 | Geier et al. | |
| 2002/0052255 A1* | 5/2002 | Trevino | A63B 69/0002 473/455 |
| 2008/0018472 A1 | 1/2008 | Dasilva et al. | |
| 2014/0184425 A1 | 7/2014 | Smith et al. | |
| 2014/0309918 A1 | 10/2014 | Rivet | |
| 2015/0054629 A1 | 2/2015 | Schulenberg | |
| 2015/0090496 A1 | 4/2015 | Rempe et al. | |
| 2015/0094953 A1* | 4/2015 | Montgomery | G06K 9/00671 701/514 |
| 2016/0130785 A1 | 5/2016 | Geier et al. | |

OTHER PUBLICATIONS

European Patent Office Extended Search Report for Application No. 17814014.1 dated Feb. 7, 2020 (9 pages).

* cited by examiner

SYSTEMS AND METHODS FOR DETERMINING OPERATOR LOCATION TO ENSURE APPROVED OPERATION OF WORK MACHINES

CROSS REFERENCE TO RELATED APPLICATIONS

This application claims priority to U.S. Provisional Patent Application Ser. No. 62/350,052 titled "systems and methods for determining operator location to ensure approved operation of work machines" filed Jun. 14, 2016, the contents of which are incorporated by reference herein in their entirety.

FIELD OF THE INVENTION

The present disclosure relates generally to systems and methods for determining operator location to ensure approved operation of work machines. More specifically, the disclosure relates to a 360-degree infrared-based work machine operator locating system and methods of using same to facilitate approved operation of work machines.

SUMMARY

Systems and methods for locating a work machine operator to ensure approved operation of work machines are disclosed herein. According to an embodiment, a system for locating a work machine operator to ensure approved operation of a work machine comprises the work machine. The work machine includes a machine controller and a radio frequency receiver. The work machine further includes an infrared transmitter unit which is disposed on a surface of the work machine. The infrared transmitter unit has a plurality of infrared transmitters arranged in a solitary horizontal plane at a perimeter of an imaginary circle. Each of the plurality of infrared transmitters is configured to generate an infrared signal comprising coded data so as to divide a 360-degree area around the infrared transmitter unit into a plurality of zones. The data includes at least a zone information. The system includes a remote controller remote from the work machine. The remote controller includes a radio frequency transceiver, and an infrared receiver configured to receive the coded infrared signal generated by at least one of the plurality of infrared transmitters. The remote controller further includes a computer system that comprises a processor and a non-transitory computer memory. The computer system is configured to decode the coded signal received at the infrared receiver to determine whether the operator is in an approved zone. Each of the infrared transmitters is activated in a sequence so as maximize a physical separation between two sequential infrared signals. The computer system enables the radio frequency transceiver to communicate with the radio frequency receiver. The communication is dependent on the zone information.

In an embodiment, the machine controller is coupled to each of the radio frequency receiver and the infrared transmitter unit over a Controller Area Network.

In an embodiment, the transmitter unit is disposed on an upper surface of the work machine.

In an embodiment, the transmitter unit housing is generally cylindrical.

In an embodiment, the radio frequency transceiver is operably coupled to a joystick.

In an embodiment, the computer system severs communication between the joystick and the radio frequency receiver upon determining that the operator is not in the approved zone.

In an embodiment, the approved zone comprises two or more zones.

In an embodiment, the transmitter unit includes eighteen transmitters.

In an embodiment, the computer system is further configured to compute a radial distance between the operator and the infrared transmitter unit.

In embodiments, the data includes a machine identification number and/or information about a tool operably coupled to the work machine.

In an embodiment, the remote controller is configured to receive and decode coded signals from a plurality of work machines.

In an embodiment, the plurality of work machines are of different types.

According to another embodiment, a method to determine a location of an operator of a work machine relative to the work machine to ensure approved operation of the work machine comprises the step of encapsulating, in an infrared transmitter unit, a plurality of infrared transmitters arranged in a circular configuration. The method includes the step of situating the infrared transmitter unit on the work machine, and the step of causing each of the plurality of infrared transmitters to generate an infrared signal comprising coded data so as to divide an area around the infrared transmitter unit into a plurality of zones. The method comprises the step of receiving the infrared signal via an infrared receiver of a remote controller that is remote from the work machine. A computer system of the remote controller is used to decode the coded data. The method also includes the step of configuring the computer system to cause a radio frequency transceiver of the remote controller to communicate with a radio frequency receiver on the work machine. The communication is dependent on the coded data.

In an embodiment, the area is a 360-degree area surrounding the work machine.

In an embodiment, the method comprises the step of equipping the remote controller with a joystick; and the computer system disables the joystick upon determining that the operator is not in an approved zone.

In an embodiment, the method comprises the step of determining a radial distance between the operator and the infrared transmitter unit.

According to another embodiment, a system for determining a location of a work machine operator relative to a work machine comprises a machine controller, a radio frequency receiver, and an infrared transmitter unit disposed on a surface of the work machine. The infrared transmitter unit comprises a plurality of infrared transmitters configured to generate infrared signals that collectively divide a 360-degree area around the infrared transmitter unit into a plurality of zones. The system includes a remote controller remote from the work machine, which comprises a radio frequency transceiver and an infrared receiver configured to receive the infrared signal generated by at least one of the plurality of infrared transmitters. The remote controller further includes a computer system comprising a processor and a non-transitory computer memory. The computer system is configured to decode information within the one or more infrared signals to determine whether the operator is in an approved zone. The computer system enables the radio frequency transceiver to communicate with the radio frequency receiver upon determining that the operator is in the approved zone.

In an embodiment, each infrared transmitter comprises a narrow-beam infrared LED.

In an embodiment, each of the transmitters is individually and selectively accessible.

According to yet another embodiment, a system for determining a location of a work machine operator relative to a work machine comprises a transmitter unit having a plurality of transmitters configured to be disposed on the work machine. The system includes a remote controller having a processor, a memory, an input device, and a receiver. The remote controller is configured to receive and decode a signal generated by at least one of the plurality of transmitters to determine if the remote controller is in an approved zone. The input device is enabled in response to a determination that the remote controller is in the approved zone.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Figure 1:
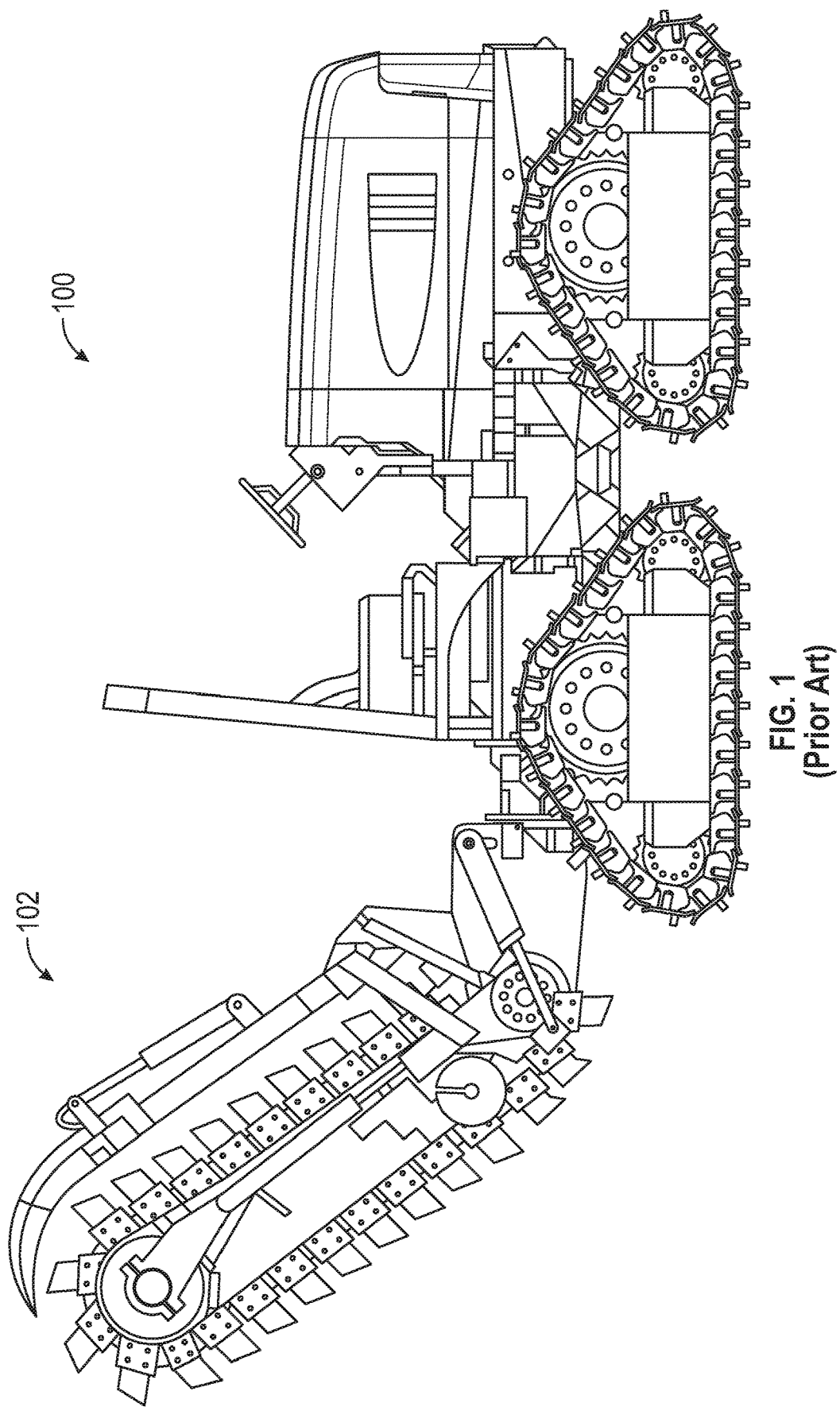
FIG. 1 is a side view of a PRIOR ART work machine.

The present disclosure relates generally to systems and methods for determining operator location to ensure approved operation of work machines, such as trenchers, excavators, backhoe loaders, skid steer loaders, bulldozers, and other such heavy equipment. FIG. 1 shows a work machine 100 as is known in the art. The illustrated work machine 100 includes a trenching tool 102 operatively coupled thereto to allow the work machine 100 to be used for the digging of trenches, to lay pipe or cable, for example. The tool 102, in some cases, may be configured to be removable from the work machine 100. Specifically, the tool 102 may be substitutable with another tool (not expressly shown), e.g., with any one of a plurality of other tools, to allow the work machine 100 to perform a variety of tasks at the job site.

For safety concerns, it may be desirable for an operator of the work machine 100 to operate same from a location remote from, or at least not in the immediate path of, the tool 102. In the prior art, to ensure that the operator is not in the vicinity of the tool 102 while the machine 100 is operating, a controller (not shown in FIG. 1) having input keys (e.g., a joystick) may be tethered to a side of the machine 100. Means may be provided to disable the work machine 100 if the controller comes untethered from the machine 100. The operator may be required to reconnect the controller at the side of the machine 100 to resume machine operation. The tether tethering the controller to the machine may be short, as such may ensure that the operator is at a side of the machine 100, and not unduly proximate the tool 102, while the machine 100 is operating.

Although an operator location at the machine side may be less hazardous than a location that is proximate (e.g., in the path of) the tool 102, it may be unsafe nevertheless. The machine 100 may have exposed moving parts (e.g., wheels, chains, et cetera) in addition to the tool 102, and as such, it may be undesirable for the operator to be proximate the machine 100 during normal operation.

Figure 2:
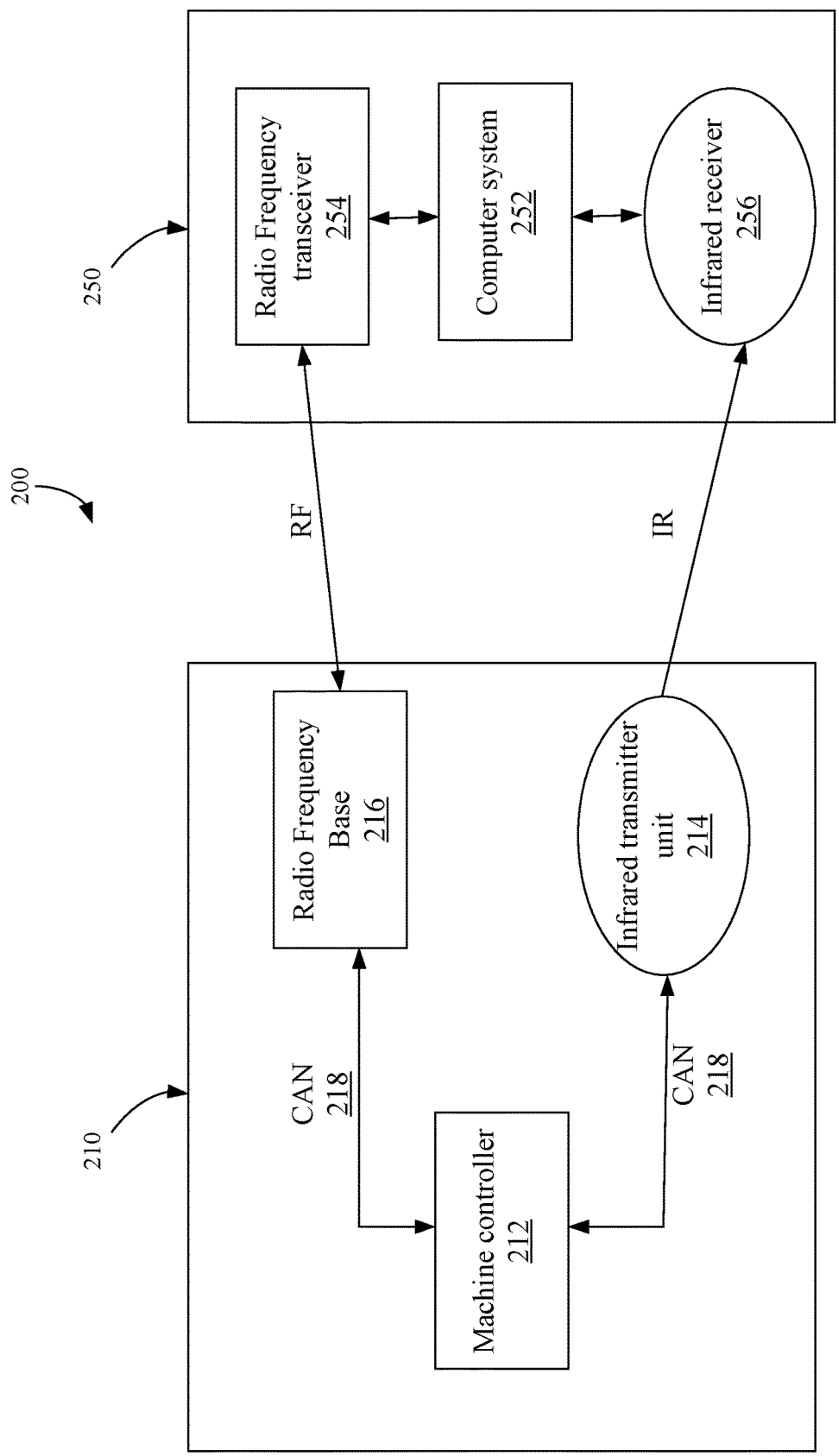
FIG. 2 is a schematic illustration of a work machine operator locator system, according to an embodiment.

Attention is directed now to FIG. 2, which schematically illustrates a work machine operator locator system 200 in accordance with an embodiment of the present disclosure. As discussed herein, the work machine operator locator system 200 may determine the location of the operator relative to the work machine 100 and may ensure that the work machine 100 operates only when the operator is in an approved zone. Such operation of the work machine (i.e., operation of the work machine 100 by a machine operator located in an approved zone) may also be referred to herein as an approved operation of the work machine 100.

The operator locator system 200 may comprise a first system 210, and a second system 250 remote therefrom and in data communication therewith. The first system 210 and the second system 250 may also be referred to herein as the machine side system 210 and the remote control system 250, respectively. At least some of the components of the machine side system 210 may be disposed on the work machine 100, and at least some of the components of the remote control system 250 may be remote from the machine 100. The disclosure below first describes the individual components of the machine side system 210 and the remote control system 250, and then outlines the workings of the operator locator system 200 as a whole.

The machine side system 210 may include a machine controller 212, an infrared transmitter unit 214, and a radio frequency base 216. The machine controller 212 may be in data communication with the infrared transmitter unit 214 and the radio frequency base 216. In some embodiments, the machine controller 212 may communicate with the infrared transmitter unit 214 and the radio frequency base 216 over a network, such as a controller area network (CAN) 218.

Figure 3:
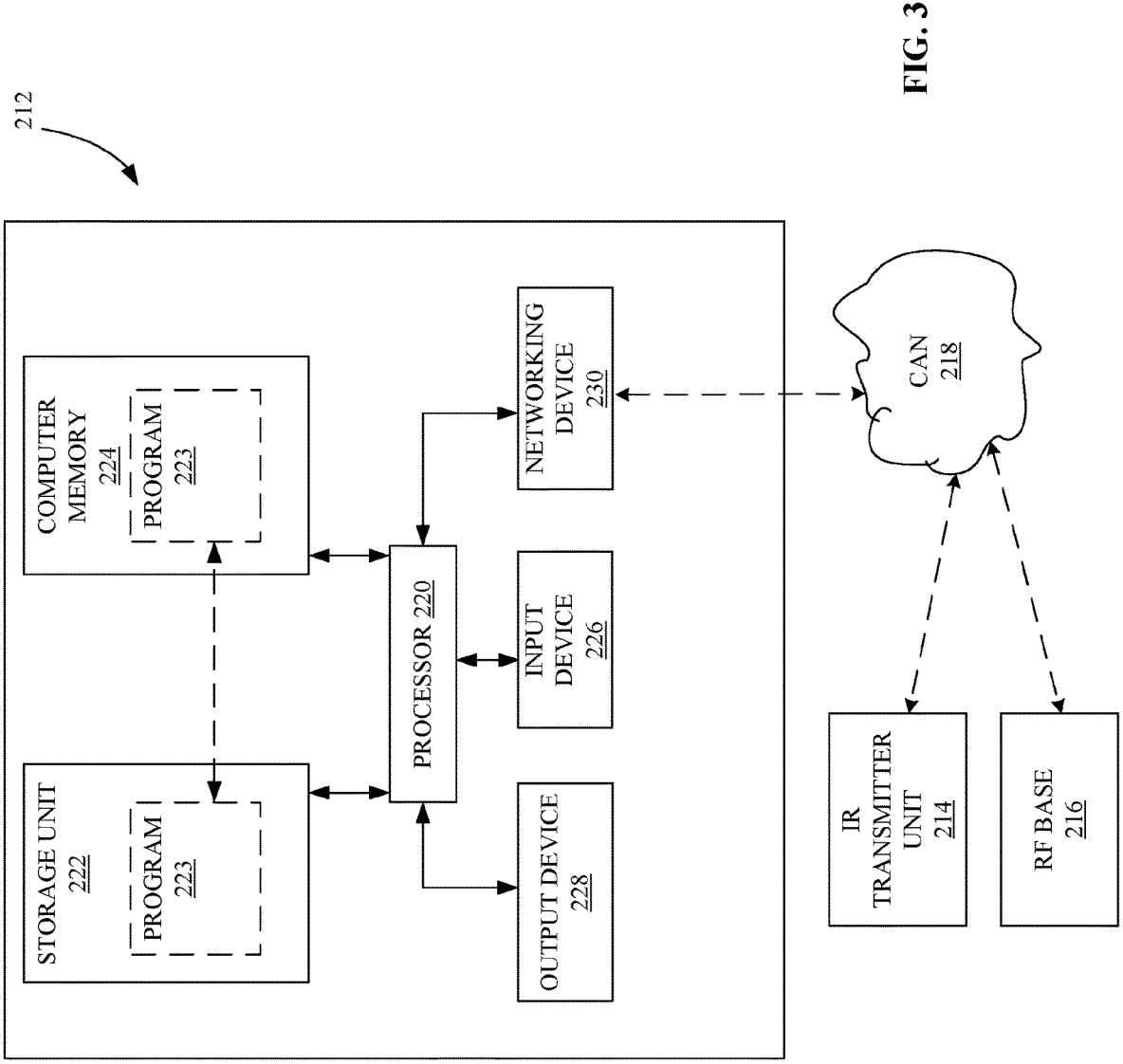
FIG. 3 is a schematic illustration of a machine side system of the work machine operator locator system of FIG. 2, according to an embodiment.

FIG. 3 schematically shows the machine controller 212 in more detail. The machine controller 212 may have a processor 220. In some embodiments, the processor 220 may include multiple processors. In some example embodiments, the processor 220 may be configured through particularly configured hardware, such as an application specific integrated circuit (ASIC), field-programmable gate array (FPGA), et cetera, and/or through execution of software to control the machine controller 212 to perform functionality in accordance with the disclosure herein.

The processor 220 may be in data communication with a storage unit 222, a computer memory 224, an input device 226, an output device 228, and a networking device 230, each of which are discussed in more detail below.

The storage unit 222 may be, for example, a disk drive that stores programs and data, and the storage unit 222 is illustratively shown storing a program 223 embodying one or more of the method steps set forth below. It should be understood that the program 223 could be broken into subprograms and stored in storage units of separate computers and that data could be transferred between those storage units using methods known in the art. A dashed outline within the computer memory 224 represents the software program 223 loaded into the computer memory 224 and a dashed line between the storage unit 222 and the computer memory 224 illustrates the transfer of the program 223 between the storage unit 222 and the computer memory 224.

The input device 226 may be any input device that allows for or facilitates the transfer of data to the machine controller 212. For example, the input device 226 may include one or more of a touch screen, an ID card reader, a keyboard, a mouse, a port (e.g., a USB port), a slot (e.g., an SD card slot), a switch, a knob, a biometric sensor (e.g., iris sensor, voice recognition sensor, or fingerprint scanner), and/or any other appropriate input device whether currently available or later developed. The output device 228 may similarly be any suitable device that allows the machine controller 212 (and more specifically, the processor 220) to output data, such as a touch screen display, an LCD or Plasma type display screen, a printer, a speaker, or any other appropriate visual and/or audible output device whether currently available or subsequently developed. The networking device 230 may be any device that allows the machine controller 212 to communicate over a network, such as the control area network 218, with the infrared transmitter unit 214 and the radio frequency base 216. In some embodiments, the networking device 230 may include a plurality of networking devices that allows the machine controller 212 to communicate over various networks (e.g., Wi-Fi, Bluetooth®, et cetera) with numerous devices.

Figure 4:
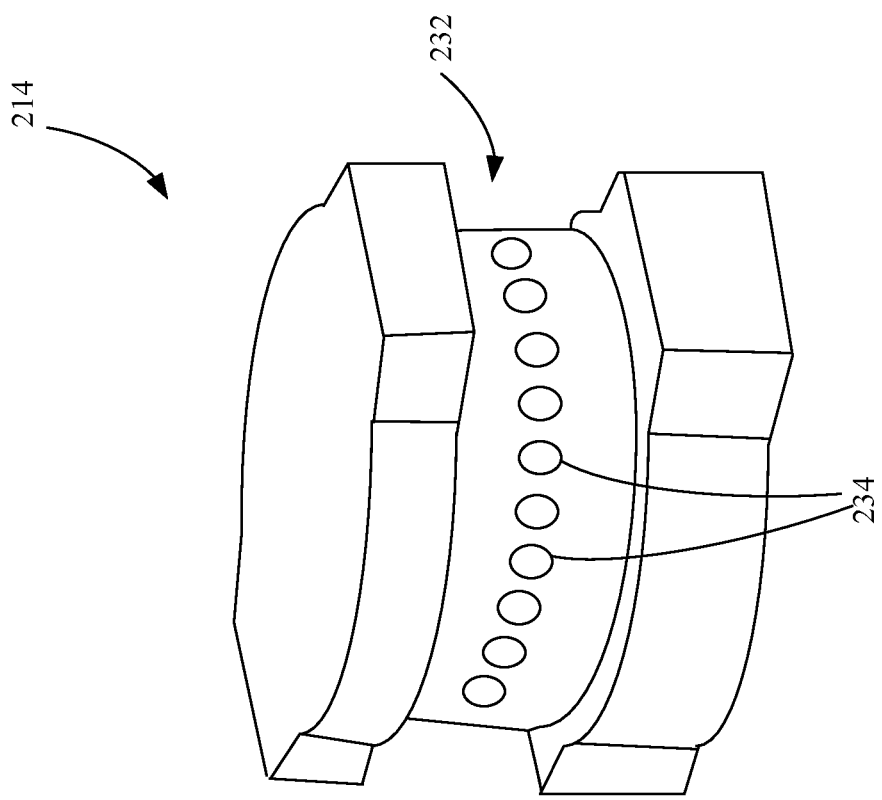
FIG. 4 is a perspective view of an infrared transmitter unit of the machine side system of FIG. 2, according to an embodiment.

Focus is directed to FIG. 4, which shows the infrared transmitter unit 214 (see FIG. 2) in more detail. The infrared transmitter unit 214 may comprise a generally cylindrical housing 232. The housing 232 may include a printed circuit board (not expressly shown) and a plurality of outwardly facing narrow-beam infrared transmitters 234. Each infrared transmitter 234 may comprise an infrared LED. In an example embodiment, each outwardly facing transmitter 234 may be arranged generally in the same horizontal plane at the perimeter of an imaginary circle such that there is an equal distance between each transmitter 234 and the two transmitters 234 adjacent thereto. In other embodiments, the transmitters 234 may be arranged differently (e.g., adjacent transmitters 234 may not be equidistant, the transmitters 234 may not be collectively arranged in a circle, etc.). Further, the transmitters 234 need not be identical; for example, in some embodiments, the beam width of one transmitter 234 may be different from the beam width of another transmitter 234.

Figure 4A:
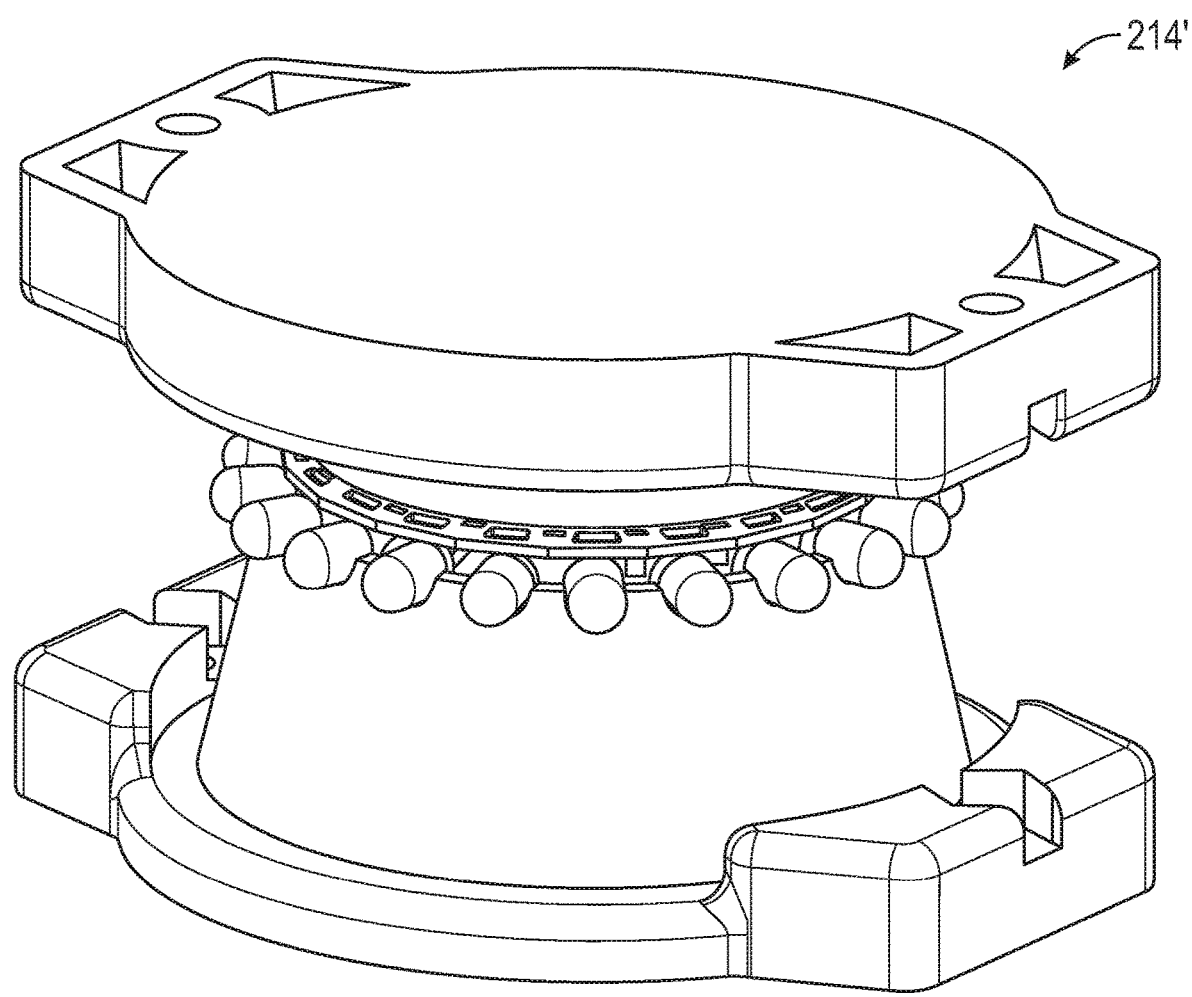
FIG. 4A is a perspective view of another embodiment of the infrared transmitter unit of the machine side system of FIG. 2.
Figure 5:
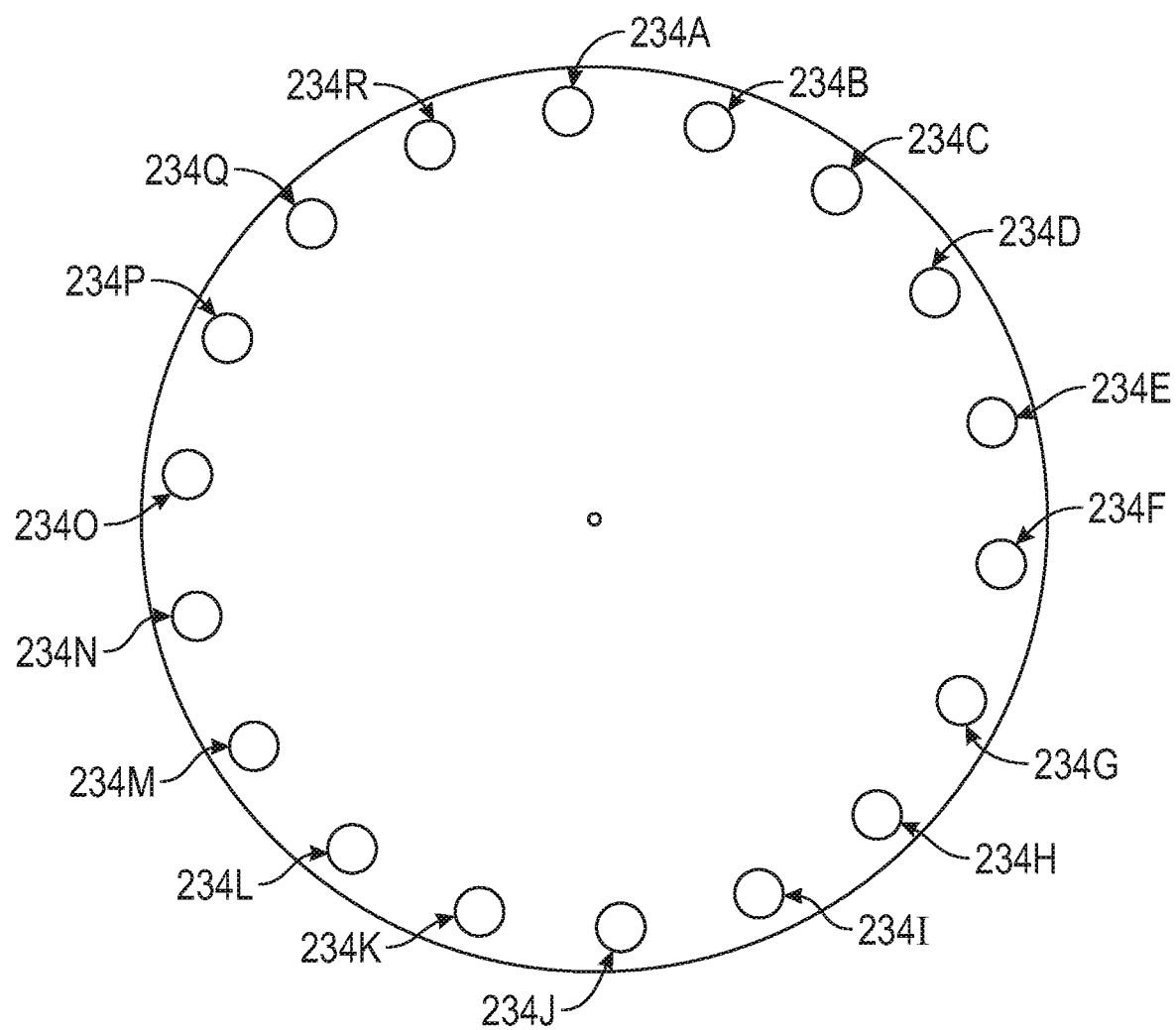
FIG. 5 is a schematic illustration showing the arrangement of infrared transmitters of the infrared transmitter unit of FIG. 4.
Figure 6:
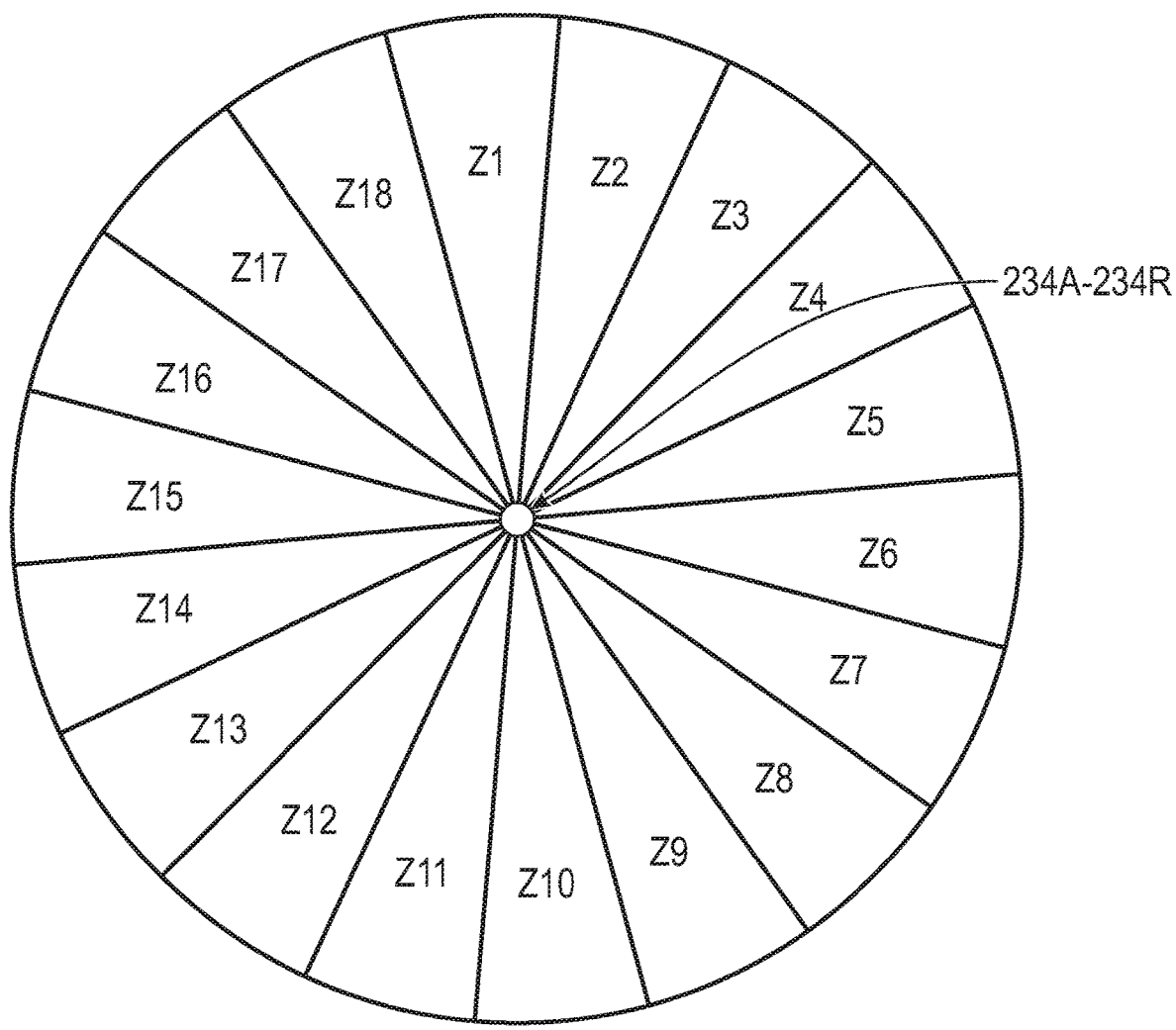
FIG. 6 is a schematic illustration illustrating infrared beams generated by the infrared transmitters of the infrared transmitter unit of FIG. 4.

In one exemplary embodiment, the infrared transmitter unit 214 may comprise between 16 and 20 narrow-beam infrared transmitters 234. For example, as shown schematically in FIG. 5, the infrared transmitter unit 214 in one embodiment may include 18 narrow-beam infrared transmitters 234, which are labeled 234A-234R. Each transmitter 234A-234R may be selectively and individually accessible (e.g., the machine controller 212 may selectively activate one or more of the transmitters 234A-234R), and each infrared transmitter 234A-234R in this embodiment may be configured to emit an infrared beam that is approximately 20 degrees wide. The area covered by each of said eighteen beams may be referred to herein as a zone Z. Thus, as shown in FIG. 6, the beams emitted by the eighteen infrared transmitters 234A-234R may form eighteen zones Z1-Z18, and each zone Z1-Z18 may be attributable to one of the eighteen transmitters 234A-234R (e.g., zone Z1 may be attributable to infrared transmitter 234A, whereas Z18 may be attributable to infrared transmitter 234R (see FIG. 5)). In this way, the beams generated by the transmitters 234A-234R may cover a 360 degree area around the transmitter unit 214 (i.e., 18 infrared transmitters*20 degree beam per transmitter=360 degrees). The skilled artisan will appreciate that while the figures show beams that are symmetrical and non-overlapping, that in practice, because of the characteristics of the individual infrared LEDs, there may be some overlap in the zones Z, particularly at close ranges. The artisan will further appreciate that the shape of the unit 214 and the housing 232, and the number and arrangement of the infrared transmitters 234 depicted in the figures, are mere examples, and are not intended to be independently limiting; what is key (or at least preferable in some embodiments) is that the beams generated by the infrared transmitters 234 cover about a 360 degree area around the unit 214 without significant gaps between the beams. FIG. 4A, for example, shows an infrared transmitter unit 214', which is an alternate embodiment of the infrared transmitter unit 214 of FIG. 4, and further illustrates that the infrared transmitter unit 214 and its housing may take on various shapes.

Returning to FIG. 2, the radio frequency base 216 of the machine side system 210 may be a radio frequency transceiver, capable of receiving and transmitting radio frequency signals so as to communicate with the remote control system 250, and particularly, a radio frequency transceiver thereof, as discussed in more detail below. As noted, the CAN 218 may be employed for communication between the machine controller 212 and the radio frequency base 216.

Figure 7:
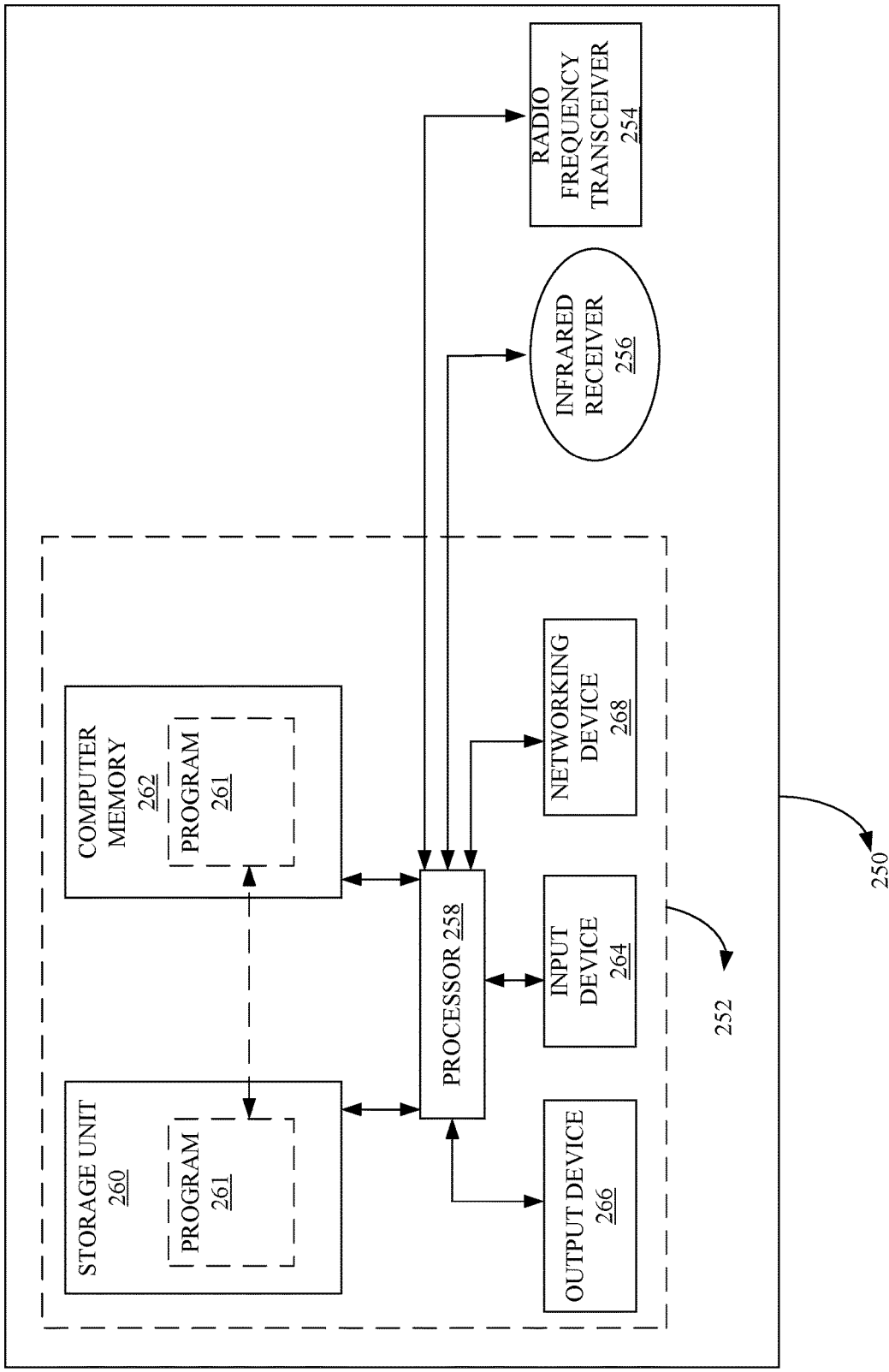
FIG. 7 is a schematic illustration of a remote control system of the work machine operator locator system of FIG. 2.

The second system (i.e., the remote control system) 250 may comprise a computer system 252, a radio frequency transceiver 254, and an infrared receiver 256. FIG. 7 shows the remote control system 250 in additional detail.

The computer system 252 may have one or more processors 258, or other such controllers, whether now known or later developed. In some embodiments, the processor 258 may be configured through particularly configured hardware, such as an application specific integrated circuit (ASIC), field-programmable gate array (FPGA), et cetera, and/or through execution of software to control the remote control system 250 to perform functionality in accordance with the disclosure herein.

The processor 258 may be in data communication with a storage unit 260 (e.g., a hard drive, flash memory, a USB memory stick, et cetera), a computer memory 262 (e.g., RAM or other such volatile memory), an input device 264, an output device 266, a networking device 268, the radio frequency transceiver 254, and the infrared receiver 256.

The storage unit 260 may store programs and data, such as a program 261 embodying one or more of the method steps set forth below. The program 261 could be broken into subprograms and stored in storage units of separate computers and data could be transferred between those storage units using methods known in the art. A dashed outline within the computer memory 262 represents the software program 261 loaded into the computer memory 262, and a dashed line between the storage unit 260 and the computer memory 262 illustrates the transfer of the program 261 between the storage unit 260 and the computer memory 262.

The input device 264 may be any input device that allows for or facilitates the transfer of data to the computer system 252. In one embodiment, the input device 264 may include a joystick or an equivalent. The input device 264 may also include one or more of a touch screen, an ID card reader, a keyboard, a mouse, a port (e.g., a USB port), a slot (e.g., an SD card slot), a switch, a knob, a biometric sensor, and/or any other appropriate input device whether currently available or later developed. The output device 266 may similarly be any suitable device that allows the remote control system 250, and more specifically, the processor 258 thereof, to output data, such as a touch screen display, an LCD or Plasma type display screen, a printer, a speaker, or any other appropriate visual and/or audible output device whether currently available or subsequently created. The networking device 268 may be any device that allows the remote control system 250 to communicate over a network.

The computer system 252 may be in data communication with the radio frequency transceiver 254 and the infrared receiver 256. In some embodiments, the infrared receiver 256 may be a transceiver. The radio frequency transceiver 254 of the remote controller 250 may be configured to communicate with the radio frequency base 216 of the machine side system 210. The machine side system 210, via the infrared transmitter unit 214, may be configured to communicate with the infrared receiver 256 of the remote controller 250.

Figure 8:
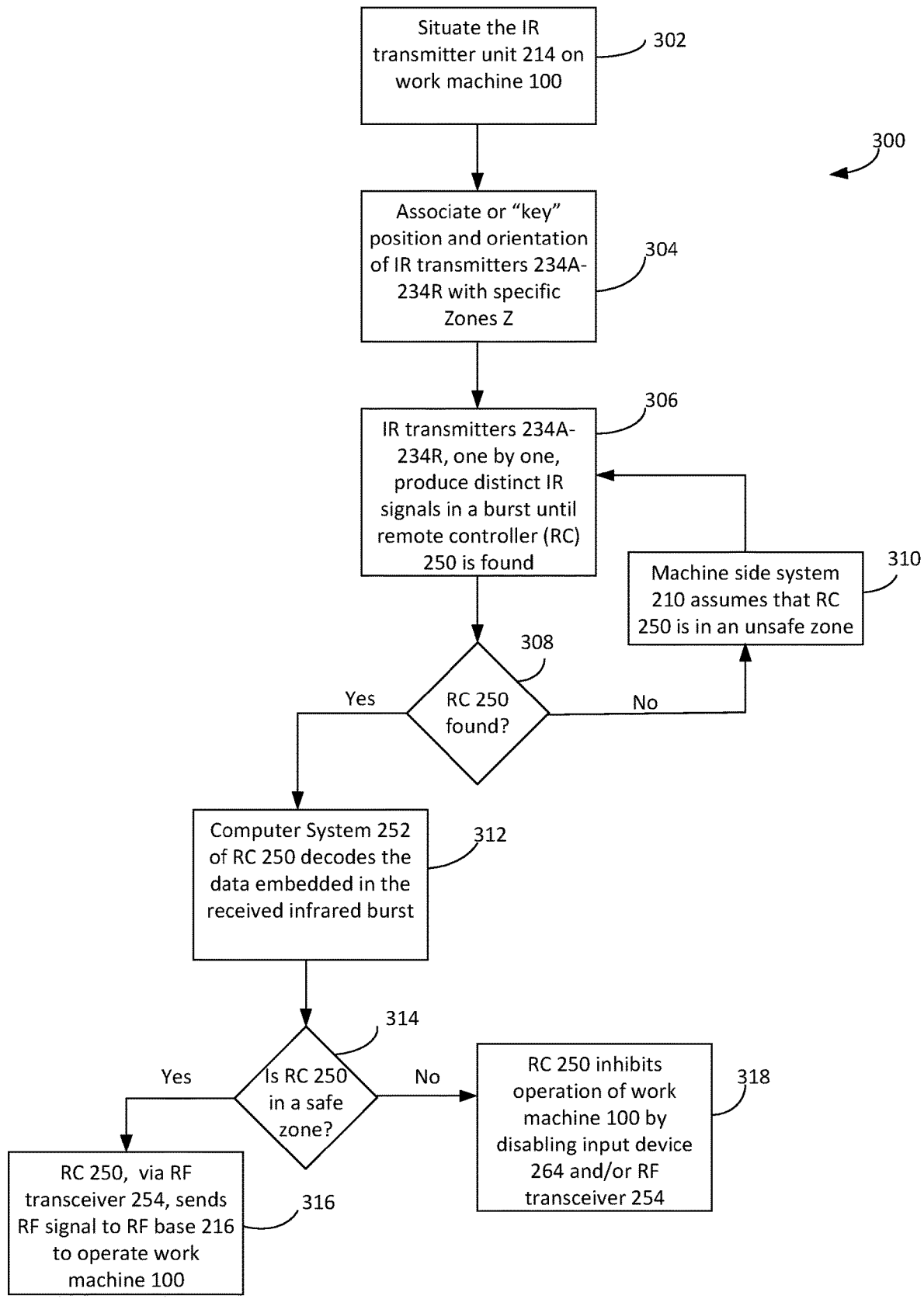
FIG. 8 is a flowchart illustrating a method of using the work machine operator locator system of FIG. 2, according to an embodiment.

Attention is directed now to FIG. 8, which shows a method 300 of employing the operator locator system 200 to ensure approved operation of the work machine 100, according to an embodiment. To illustrate the workings of the operator locator system 200 with reference to the method 300, the disclosure will rely on one or more particular examples; the artisan will appreciate, however, that the examples are provided merely as an illustration and are not intended to be independently limiting.

Figure 9:
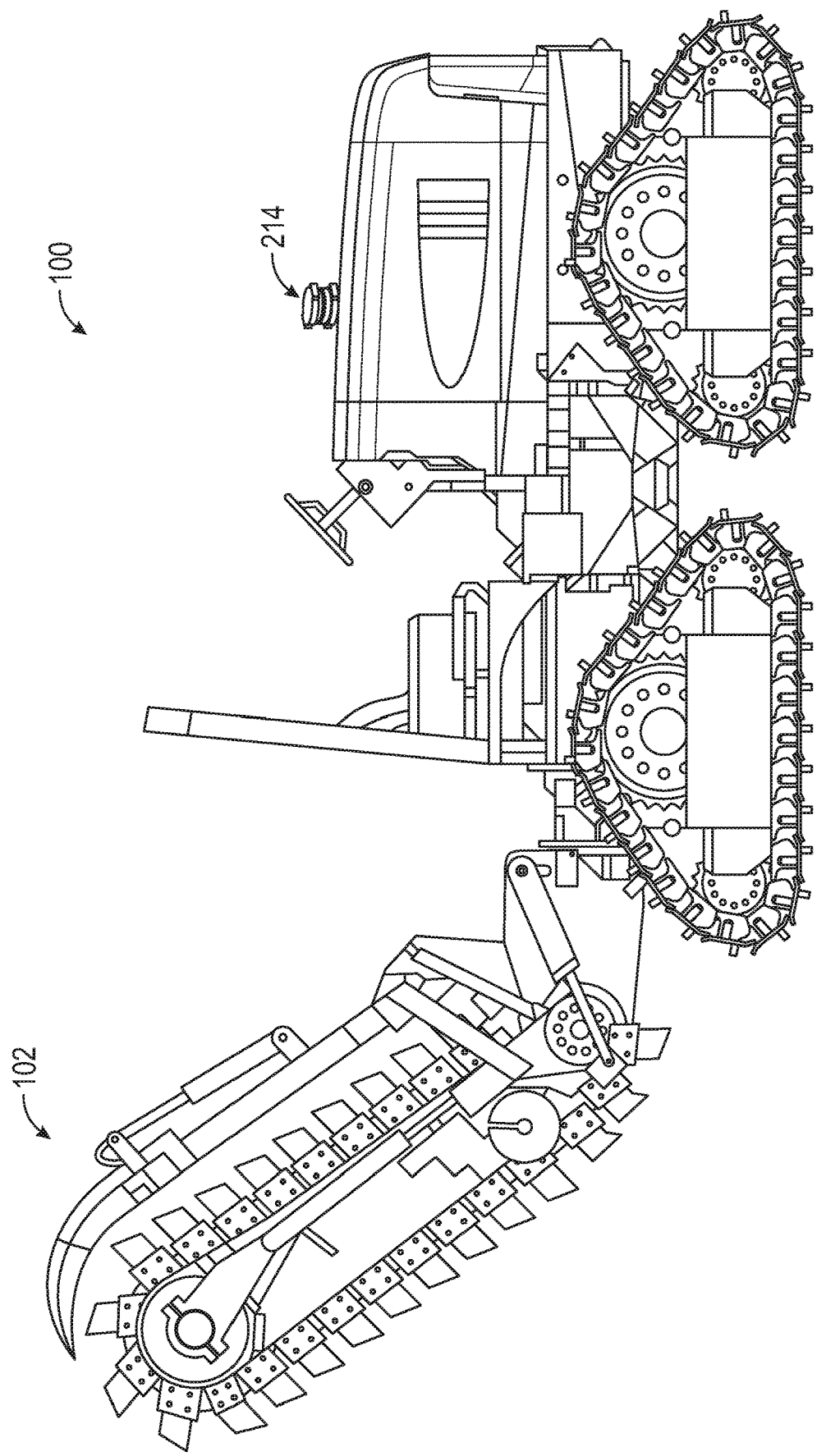
FIG. 9 is a side view of the work machine of FIG. 1 with the infrared transmitter unit of FIG. 4 disposed thereon.

The method 300 may begin at step 302, where an operator of the work machine 100, or other personnel, may situate the infrared transmitter unit 214 (see FIG. 4) on the work machine 100. In some embodiments, the infrared transmitter unit 214 may be positioned and secured at one of the upper surfaces of the work machine 100, such as atop the hood of the work machine 100, as shown in FIG. 9. In some embodiments, a substantially flat platform (not expressly shown) may be provided on the work machine 100 to facilitate the positioning and securement of the transmitter unit 214 to the work machine 100.

Figure 10:
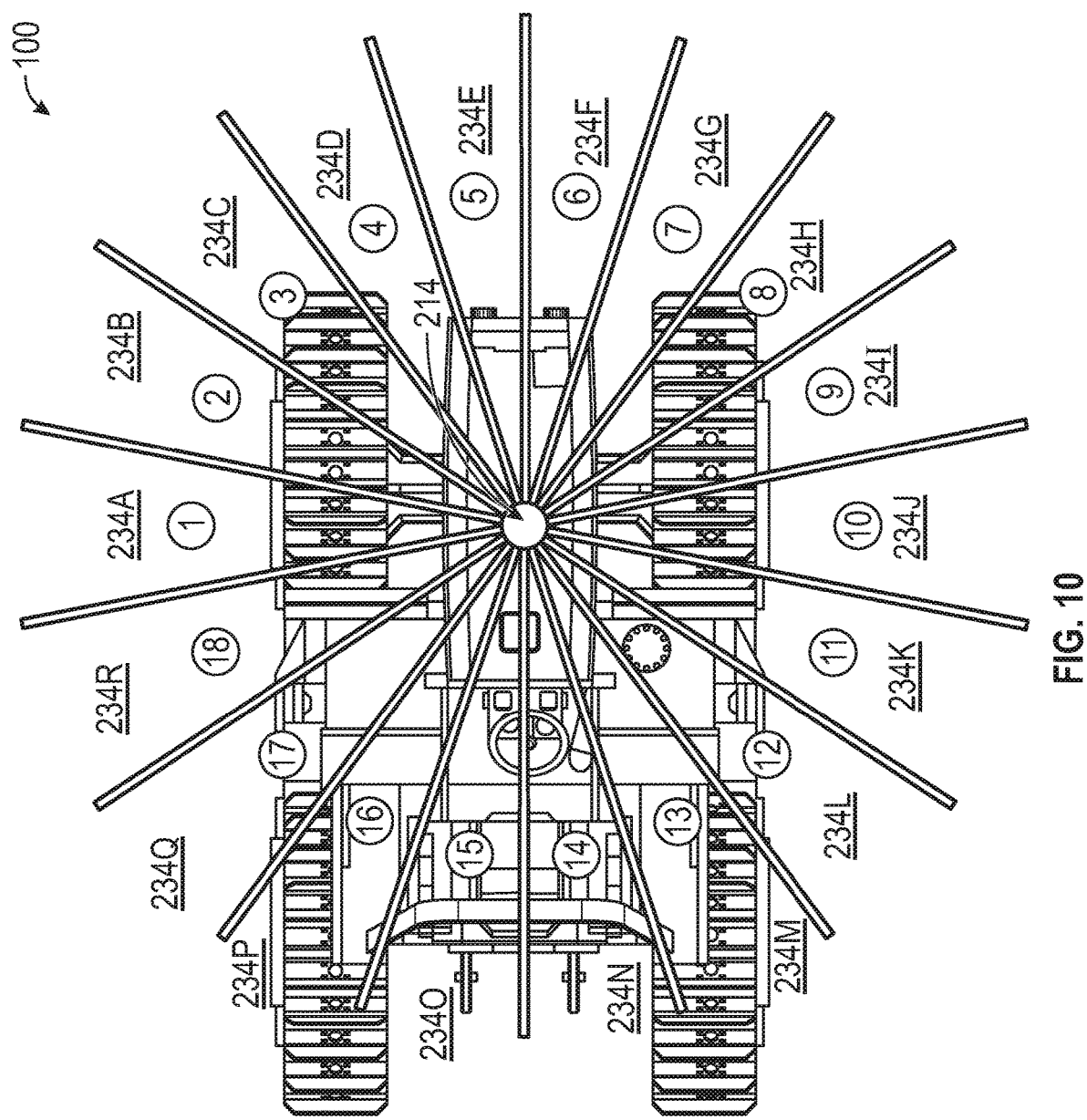
FIG. 10 is a top view of the work machine of FIG. 9 illustrating zones formed by infrared transmitters of the infrared transmitter unit disposed on the work machine.

At step 304, the position and orientation of the infrared transmitters (i.e., infrared transmitters 234A-234R in this example (see FIGS. 4-5)) may be keyed to specific zones Z. To illustrate, consider FIG. 10, which shows the infrared transmitter unit 214 situated on an upper surface of the work machine 100, and which, like FIG. 6, shows a 360-degree area around the transmitter unit 214 being divided into a plurality of zones (18 zones in this example). The zone Z labeled 1 in FIG. 10 may correspond to the infrared beam generated by the infrared transmitter 234A (see FIG. 5) of the infrared transmitter unit 214; zone 2 may correspond to the infrared beam generated by the infrared transmitter 234B of the infrared transmitter unit 214; zone 3 may correspond to the infrared beam generated by the infrared transmitter 234C; and so on (e.g., zone 18 may correspond to the infrared beam generated by the infrared transmitter 234R).

For the purposes of illustration, assume that the operator, with the remote controller 250 on his person (e.g., in hand), is present in zone 18. Assume that zones 11 and 18, attributable to infrared transmitters 234K and 234R, respectively, are "approved" zones, whereas the remaining zones 1-10 and 12-17 are "unsafe" (i.e., "unapproved") zones. The operation of the work machine 100 and the tool 102 may pose no appreciable (or may pose only a minimal) danger to an operator who is present in an approved zone, at least under normal operation. On the other hand, if an operator is present in an unapproved zone (e.g., in zone 234O proximate the tool 102), the operation of the work machine 100 and the tool 102 may pose a safety hazard for the operator. The operator locator system 200 may ensure that the work machine 100, including the tool 102 thereof (see FIG. 1), operates only when the operator is in an approved zone. While zones 11 and 18 on the sides of the work machine 100 have been designated as approved zones in this example, the artisan will appreciate that such designation is exemplary only and that any number of zones may likewise be designated as approved zones. The artisan will further appreciate that a particular zone (e.g., zone 5 in front of the work machine 100) may be unsafe for one type of work machine 100 but may be considered an approved zone for a different type of work machine 100. Factors which may be taken into account when designating a particular zone Z as an approved zone or an unapproved zone may include: characteristics (e.g., size and type) of the machine 100, characteristics of the tool 102, characteristics of the underlying terrain, experience of the operator, the amount of reflected energy that may reach the infrared receiver 256 within a particular zone, et cetera. The artisan will appreciate that one or more additional factors may likewise be taken into account when designating a particular zone Z as approved or unapproved, and that not all factors listed above need to be considered for every application.

Returning now to FIG. 8, at step 304, the machine controller 212 may be used to key the infrared transmitters 234A-234R to specific zones Z. In some embodiments, the operator or other personnel may manually select (using the input device 226, for example (see FIG. 3)) the zones which are to be considered approved zones. In other embodiments, the machine controller 212 may be programmed (e.g., via program 223 (see FIG. 3)) to demarcate the approved and unapproved zones based on the type of the machine 100, the tool 102 being employed, and/or other such considerations. In other embodiments still, the remote controller 250, and specifically the computer system 252 thereof, may be provided with functionality to determine whether a zone Z is approved or unapproved with respect to the operation of that particular work machine 100 and tool 102, as discussed herein.

Once the position and orientation of the infrared transmitters 234A-234R has been keyed to the specific approved and unapproved zones Z, at step 306, the machine controller 212 may cause the infrared transmitters 234A-234R of the infrared transmitter unit 214 to generate distinct infrared bursts. More specifically, the machine controller 212 may cause the infrared transmitters 234A-234R to produce distinct infrared bursts one by one. Each infrared burst generated by the infrared transmitters 234A-234R may be embedded with data identifying the corresponding zone and zone-specific enablement information for the work machine 100.

For example, the infrared burst transmitted by the infrared transmitter 234A may be coded with data indicating that the burst is associated with zone 1 and that zone 1 is an unapproved zone. Similarly, the infrared burst generated by the infrared transmitter 234J may include data indicating that it is associated with zone 10 and that zone 10 is an unapproved zone. Conversely, the infrared burst generated by infrared transmitter 234K associated with zone 11, which in this example is an approved zone, may include data indicating that the burst is associated with zone 11 and that zone 11 is an approved zone. In some embodiments, each infrared burst may further include information about machine 100 (e.g., the machine type) and the type of tool 102 coupled to the work machine 100, among other relevant data. Such coded information about the zones (e.g., information outlining that a particular zone is an approved (or an unapproved) zone may be referred to herein zone information).

In an exemplary embodiment, the infrared bursts, which are transmitted by the infrared transmitters 234A-234R one by one, may be sequenced so as to provide for greater physical separation between two sequentially generated beams. For instance, the machine controller 212 may cause the infrared transmitter 234A to transmit the first infrared burst, and cause the infrared red transmitter 234J, which opposes the infrared transmitter 234J, to transmit the second burst. In more detail, instead of transmitting bursts associated with zones 1-18 serially in clockwise or counterclockwise fashion, the machine controller 212 may cause the infrared transmitters 234A-234R to transmit bursts in the following sequence: infrared transmitter 234A (zone 1); infrared transmitter 234J (zone 10); infrared transmitter 234B (zone 2); infrared transmitter 234K (zone 11); infrared transmitter 234C (zone 3); infrared transmitter 234L (zone 12); infrared transmitter 234D (zone 4); infrared transmitter 234M (zone 13); infrared transmitter 234E (zone 5); infrared transmitter 234N (zone 14); infrared transmitter 234F (zone 5); infrared transmitter 234O (zone 15); infrared transmitter 234G (zone 7); infrared transmitter 234P (zone 16); infrared transmitter 234H (zone 8); infrared transmitter 234Q (zone 17); infrared transmitter 234I (zone 9); and infrared transmitter 234R (zone 18). The greater physical separation between two consecutively deployed infrared beams may enhance the accuracy of the operator detection, as will become clear from the disclosure below.

Returning to step 306, in this example, the machine controller 212 may first cause the infrared transmitter 234A to transmit an infrared burst coded with the zone and machine enablement information (e.g., zone 1, unapproved zone). As the operator having the remote controller 250 in this example is in zone 18, the infrared receiver 256 of the remote controller 250 may not detect the burst. Thus, at step 308, upon receiving no response from the remote controller 250, the machine controller 212 may assume at step 310 that the remote controller 250 is in an unapproved zone. That is, in embodiments, a failure to confirm that the remote controller 250 is in an approved zone may be tantamount to a determination that the remote controller 250 is in an unapproved zone. Such may ensure that the work machine 100 operates only upon a positive determination that the operator (and specifically, the remote controller 250) is in an approved zone.

The method 300 may thus loop back to step 306, where the machine controller 212 may now cause the infrared transmitter 234J to transmit a burst embedded with data identifying and characterizing the zone (e.g., zone 10, unapproved zone). At step 308, upon receiving no response from the remote controller, the machine controller 212 at step 310 may assume that the remote controller is in an unapproved zone. The method 300 may thus loop back to step 306, where the machine controller 212 may now cause the infrared transmitter 234B to transmit a burst encoded with zone identification and machine enablement data (e.g., zone 2, unapproved zone). At step 308, upon receiving no response from the remote controller 250, the machine controller 212 at step 310 may assume that the remote controller is in an unapproved zone. Next, the machine controller at step 306 may cause the transmitter 234K, associated with an approved zone (zone 11), to transmit an infrared burst encoded with data identifying and characterizing the zone (e.g., zone 11, approved zone). Upon receiving no response from the remote controller 250, the machine controller 212 may assume at step 310 that the remote controller 250 is in an unapproved zone and the method 300 may loop back to step 306. Each of transmitters 234C, 234L, 234D, 234M, 234E, 234N, 234F, 234O, 234G, 234P, 234H, 234Q, and 234I may likewise be caused to produce an infrared burst encoded with zone information (and, in some embodiments, data associated with the particular machine 100) in an attempt to locate the remote controller 250.

After the infrared transmitter 234I (zone 9) has been activated and the machine controller 212 has determined at step 310 that the remote controller 250 is not in zone 9, the machine controller 212 at step 306 may cause the infrared transmitter 234R (zone 18) to generate an infrared burst encoded with data identifying and characterizing the zone (e.g., zone 18, approved zone). As the remote controller 250 is located in zone 18 in this example, the infrared receiver 256 thereof (see FIG. 7) may receive the infrared burst generated by the infrared transmitter 234R.

At step 312, the remote controller 250, and specifically, the computer system 252 thereof, using the program 261 (see FIG. 7), may decode the infrared signal and decipher the coded information. For example, at step 314, the remote controller 250 may decode the data (e.g., the zone information) embedded in the infrared burst generated by the infrared transmitter 234R and ascertain that the remote controller 250 is currently located in zone 18, which is an approved zone. The remote controller 250 may adjust its functionality based on this data it receives from the infrared transmitter 234R. For instance, in this example, if the operator uses the input device 264 (such as a joystick) of the remote controller 250 in an attempt to cause the work machine 100 to move forward, the remote controller 250 may wirelessly transmit data to the work machine 100 to effectuate this forward motion. More specifically, if the operator is in an approved zone and uses the joystick 264 to instruct the work machine 100 to move forward, at step 316, the radio frequency transceiver 254 of the remote controller 250 may transmit a radio frequency signal to the radio frequency base 216 of the machine side system 210; this signal may in-turn be received over the CAN 218 by the machine controller 212, which may resultantly cause the work machine 100 to move forward in line with the input the operator provided to the input device 264 of the remote controller 250. Alternately, if the remote controller 250 had determined at step 314 that it is in an unapproved zone (e.g., in zone 17), the program 261 may have at step 318 disabled one or more functions of the input device 264; for example, a determination that the remote controller 250 is in an unapproved zone may have served to disable the input device 264 (or the radio frequency transceiver 254) such that the operator is precluded from using the joystick 264 to cause the work machine 100 to move forward. Alternately, upon determining that the remote controller 250 is an unapproved zone, the radio frequency transceiver 254 may transmit a "disallow" signal to the radio frequency base 216, which may preclude the work machine 100 from operating irrespective of any input provided by the operator via the input device 264. In this way, the operator control system 200, via the method 300, may ensure that the work machine 100 operates only when the remote controller 250 is in an approved zone. Some of the steps of the method 300 (e.g., steps 306 onward) may be repeated until the machine 100 and/or the remote controller 250 is powered off.

Figure 11:
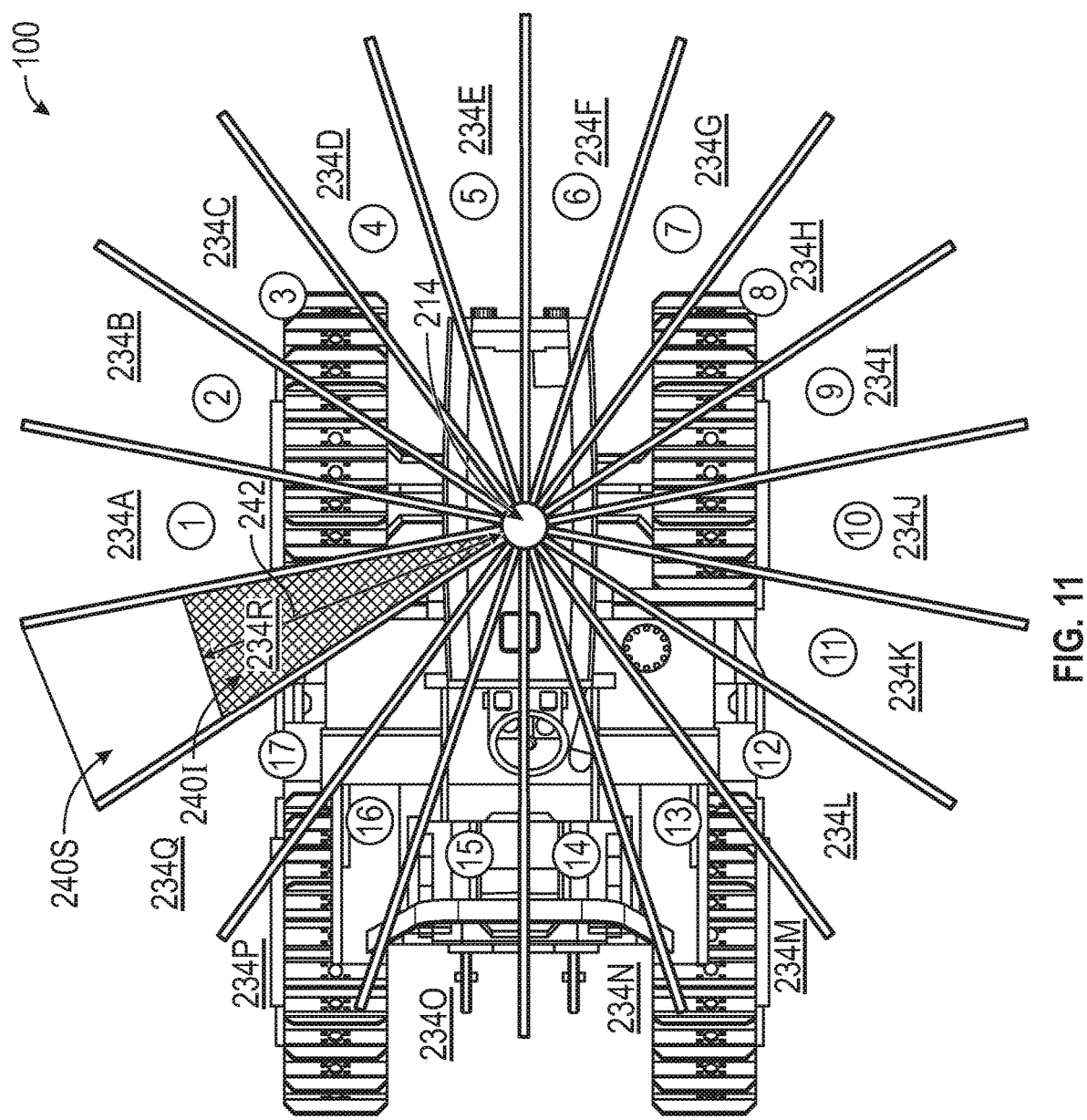
FIG. 11 is a top view of the work machine of FIG. 9 illustrating an insecure area and a secure area within a zone.

In some embodiments, the operator locator system 200 may further determine a radial distance between the infrared transmitter unit 214 and the remote controller 250. The artisan will appreciate that even an approved zone Z (e.g., zone 18 in this example) may include an area in which the presence of the operator during machine operation may pose a safety concern. Specifically, with reference to FIG. 11, an approved zone (e.g., zone 18) may include an insecure area 240I proximate the machine 100 and a secure area 240S further away from the machine 100. The operator locator system 200, in addition to ensuring that the machine 100 operates only when the operator is in an approved zone, may in some embodiments further inhibit machine operation until it confirms that the operator is within the secure area 240S of the approved zone. In an exemplary embodiment, to ensure that the operator is within the secure area 240S, the operator control system 200 may determine a radial distance between the operator (i.e., the remote controller 250) and the infrared transmitter unit and inhibit machine operation until this radial distance exceeds a given threshold 242 (see FIG. 11). The threshold 242 may vary from machine to machine and from one application to another.

In one example embodiment, the infrared transmitter unit 214 may comprise a variable current source (not expressly shown). The length of the modulated infrared beams transmitted by the infrared transmitters 234A-234R and detectable by the infrared receiver 256 may be generally proportional to the pulse peak current. The machine controller 212 may cause the infrared transmitters 234A-234R to transmit multiple signals at varying power, and may approximate the distance between the infrared transmitter on the work machine 100 and the infrared receiver 256 of the remote controller 250 by determining the power level needed for the receiver 256 to detect the signal. Additionally, by restricting the power level, the machine controller 212 may ensure that detection of the infrared signals by the infrared receiver 256 is only possible within a predetermined distance between the transmitters 234A-234R and the receiver 256.

In embodiments, the machine controller 212 does not contain any logic for modifying the performance of the work machine 100 as it relates to the location of the work machine 100 relative to the remote controller 250. Rather, it is the remote controller 250 that, upon receiving the infrared signal from the infrared transmitters 234A-234R, ascertains (using, for example, the processor 258 and the program 261) the position of the remote controller 250 relative to the machine 100 and adjusts its functionality accordingly. Equipping the remote controller 250 with such logic may allow a solitary remote controller 250 to be used to ensure approved operation of numerous types of work machines 100 having one of any or more of number of tools 102, which may be preferable to equipping each individual work machine 100 with such logic. In embodiments, thus, the infrared bursts transmitted by the infrared transmitters 234A-234R may each be embedded with zone identification data and a unique machine ID corresponding to the machine 100 being operated, which may allow the remote controller 250 to access the appropriate logic corresponding to that machine 100.

In some embodiments, the remote controller 250 may include functionality to determine whether the infrared signals received by the infrared receiver 256 include signals that have reflected off a surface. For example, the remote controller 250 may know the sequence in which the infrared beams are generated by the various transmitters 234A-234R, and/or the time delay between two consecutive beams. If the infrared receiver 256 receives an infrared beam associated with a particular transmitter out of turn, receives two or more codes generally simultaneously, etc., the remote controller 250 may determine that the received signals include reflections. In such case, the remote controller 250 may assume that it is in an unapproved zone and inhibit machine operation until it positively determines that it is in an approved zone. That is, if the remote controller 250 receives an infrared beam indicating that the remote controller 250 is in an approved zone and simultaneously (or generally simultaneously) receives another infrared beam (e.g., a reflection) indicating that the remote controller 250 is an unapproved zone, the operation of the work machine 100 may be disabled (i.e., the zone may be considered an unapproved zone) because the location of the remote controller 250 is not unambiguously confirmed. In other embodiments, however, the operator may be allowed to use the remote controller 250 to control the operation of the machine 100 so long any one of a plurality of infrared beams received by the remote controller 250 includes data indicating that the remote controller 250 is an approved zone (i.e., if one infrared beam indicates that the remote controller 250 is in an approved zone and another infrared beam received by the remote controller 250 generally simultaneously indicates that the remote controller 250 is in an unapproved zone, the operator may be allowed to use the remote controller 250 to control the operation of the work machine 100).

The artisan will appreciate that while an infrared transmitter unit 214 with eighteen transmitters 234A-234R has been expressly disclosed, that the transmitters of the infrared transmitter unit 214 may also be configured differently. For example, the infrared transmitter unit 214 may include 36 infrared transmitters, each producing a burst that is about ten degrees wide, so as to cover the 360-degree area around the transmitter unit 214.

In some embodiments, the infrared transmitter unit 214 may, in addition to the infrared transmitters 234 (e.g., the transmitters 234A-234R), include one or more visible light sources. For example, in embodiments, a visible light source (such a visible light LED) may be paired with each transmitter 234A-234R within the unit 214. The visible light LEDs may provide feedback to the operator. For example, the visible light LEDs may emit visible light to indicate that the infrared transmitter unit 214 is not receiving any signal from the remote control system 250. Or, for instance, the visible light LEDs may emit visible light to indicate that a particular zone is an approved zone. While not required, the housing 232 may, in embodiments, also include other visible lights (e.g., in embodiments, a strobe (or other visible) light may be situated within or atop the housing 232).

While the disclosure above focuses on an infrared transmitter unit 214 having transmitters 234 and an infrared receiver 256, such is merely exemplary. Transmitters that emit energy in other bands of the energy spectrum (e.g., in visible or other invisible bands) may likewise be employed with corresponding receivers. For example, in an embodiment, the transmitter unit situated on the work machine 100 may include laser transmitters and the receiver of the remote controller 250 may include a laser receiving module. Indeed, many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for locating a work machine operator to ensure approved operation of a work machine, the system comprising:
   the work machine, comprising:
      a machine controller;
      a radio frequency receiver; and
      an infrared transmitter unit disposed on a surface of the work machine; the infrared transmitter unit comprising a plurality of infrared transmitters arranged in a solitary horizontal plane; each of said plurality of infrared transmitters configured to generate an infrared signal comprising coded data so as to divide a 360-degree area around the infrared transmitter unit into a plurality of zones; the data including at least a zone information;
   a remote controller remote from the work machine, the remote controller comprising:
      a radio frequency transceiver;
      an infrared receiver configured to receive the coded infrared signal generated by at least one of said plurality of infrared transmitters; and
      a computer system comprising a processor and a non-transitory computer memory; the computer system configured to decode the coded signal received at the infrared receiver to determine whether the operator is in an approved zone;
   wherein each of the infrared transmitters is activated in a sequence;
   wherein the computer system enables the radio frequency transceiver to communicate with the radio frequency receiver; said communication being dependent on the zone information.

2. The system of claim 1, wherein the machine controller is coupled to each of the radio frequency receiver and the infrared transmitter unit over a Controller Area Network.

3. The system of claim 1, wherein the surface is an upper surface.

4. The system of claim 1, wherein the infrared transmitter unit has a cylindrical housing.

5. The system of claim 1, wherein the radio frequency transceiver is operably coupled to a joystick.

6. The system of claim 5, wherein the computer system severs communication between the joystick and the radio frequency receiver upon determining that the Operator is not in the approved zone.

7. The system of claim 6 wherein the approved zone comprises at least two zones.

8. The system of claim 1 wherein the plurality of infrared transmitters includes eighteen transmitters.

9. The system of claim 1 wherein the computer system further computes a radial distance between the operator and the infrared transmitter unit.

10. The system of claim 1, wherein the data includes a machine identification number.

11. The system of claim 10, wherein the data further includes information about a tool operably coupled to the machine.

12. The system of claim 1, wherein the remote controller is configured to receive and decode coded signals from a plurality of work machines.

13. The system of claim 12, wherein the plurality of work machines comprises a first type of work machine and a second type of work machine.

14. A method to determine a location of an operator of a work machine relative to the work machine to ensure approved operation of the work machine, comprising steps:
   encapsulating, in an infrared transmitter unit, a plurality of infrared transmitters arranged in a circular configuration;
   situating the infrared transmitter unit on the work machine;
   causing each of said plurality of infrared transmitters to generate an infrared signal comprising coded data so as to divide an area around the infrared transmitter unit into a plurality of zones;
   receiving the infrared signal via an infrared receiver of a remote controller; the remote controller being remote from the work machine;
   using a computer system of the remote controller to decode the coded data;
   configuring the computer system to cause a radio frequency transceiver of the remote controller to communicate with a radio frequency receiver on the work machine; the communication being dependent on the coded data.

15. The method of claim 14, wherein the area is a 360-degree area surrounding the work machine.

16. The method of claim 14, further comprising equipping the remote controller with a joystick; and wherein, the computer system disables the joystick upon determining that the operator is not in an approved zone.

17. The method of claim 16, further comprising determining a radial distance between the operator and the infrared transmitter unit.

18. A system for determining a location of a work machine operator relative to a work machine, comprising:
   a machine controller;
   a radio frequency receiver; and
   an infrared transmitter unit disposed on a surface of the work machine; the infrared transmitter unit comprising a plurality of infrared transmitters configured to generate infrared signals that collectively divide a 360-degree area around the infrared transmitter unit into a plurality of zones;
   a remote controller remote from the work machine, comprising:
      a radio frequency transceiver;
      an infrared receiver configured to receive the infrared signal generated by at least one of said plurality of infrared transmitters; and
      a computer system comprising a processor and a non-transitory computer memory; the computer system configured to decode information within the one or more infrared signals to determine whether the operator is in an approved zone;

wherein the computer system enables the radio frequency transceiver to communicate with the radio frequency receiver upon determining that the operator is in the approved zone.

19. The system of claim 18 wherein each infrared transmitter comprises a narrow-beam infrared LED.

20. The system of claim 19 wherein each of said transmitters is individually and selectively accessible.

21. A system for determining a location of a work machine operator relative to a work machine, comprising:

a transmitter unit comprising a plurality of transmitters configured to be disposed on the work machine; and a remote controller having a processor, a memory, an input device, and a receiver; the remote controller configured to receive and decode a signal generated by at least one of the plurality of transmitters to determine if the remote controller is in an approved zone;

wherein the input device is enabled in response to a determination that the remote controller is in the approved zone.

* * * * *